July 26, 1949.  I. J. GRUENBERG ET AL  2,477,176
ONE-WAY OVERRUNNING CLUTCH
Filed Dec. 28, 1945

INVENTORS
IVOR J. GRUENBERG
BY CARL K. DAVIS
ATTORNEYS

Patented July 26, 1949

2,477,176

UNITED STATES PATENT OFFICE 2,477,176

ONE-WAY OVERRUNNING CLUTCH

Ivor J. Gruenberg, Pleasant Ridge, and Carl K. Davis, Detroit, Mich., assignors to The Gear Grinding Machine Company, Hamtramck, Mich., a corporation of Michigan Application December 28, 1945, Serial No. 637,511

4 Claims. (Cl. 192—45.1)

The inventon relates to one-way overrunning clutches of that type in which a series of sprags is arranged between concentric cylindrical surfaces respectively on the driving and driven members. It is the object of the instant invention to obtain a construction of this type in which frictional contact between the sprags and the driving member is released at a predetermined velocity of rotation. This will permit free overrunning of the driven member at all speeds above such predetermined point and without wear of the parts. To this end, the invention consists in a construction of sprag and energizing means for frictionally contacting the same with the driving member such that the mass reaction of the sprag will, at a predetermined velocity of rotation of the clutch, overcome the pressure of said energizing means. The invention further consists in the specific construction as hereinafter set forth.

Figure 1:
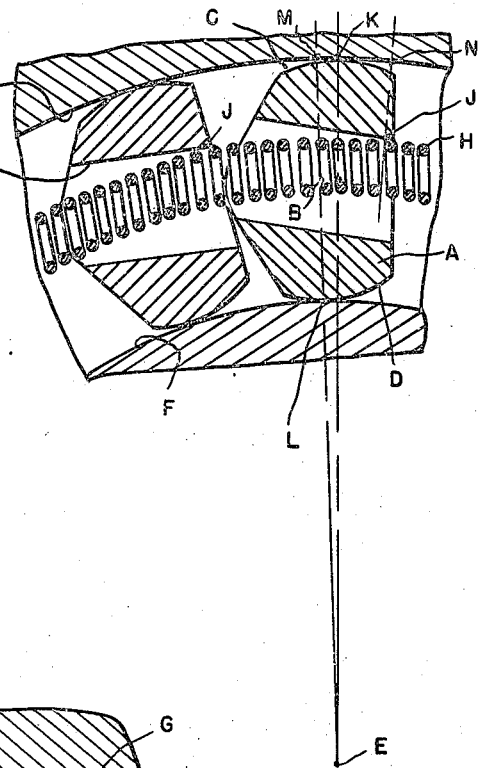
Fig. 1 is an elevation showing a plurality of sprags in relation to the concentric cylindrical surfaces of the driving and the driven members, together with the energizing means therefor.

As shown in Fig. 1, the sprag A is of a form in which the center of gravity is located at a point B. C and D are respectively segmental outer and inner end surfaces of the sprag which are eccentric to the point B. E is the axis of rotation of the clutch and F and G are concentric cylindrical surfaces respectively on the driving and driven members between which the sprags extend. H is an energizing means for the sprags which, as shown in Fig. 1, is an outwardly expanded annular coil spring extending through inclined slots I in the sprags and bearing against a point J to the right of the center of gravity. This will tend to rotate the sprag counterclockwise so as to bring the end surfaces C and D into contact with the surfaces F and G at points K and L.

It will be noted that a radial line from the axis E through the point B will intersect the surface G at a point M to the left of the point K. Thus, the mass reaction of the sprag A about the point K will have a moment proportional to the length of the line MK. On the other hand, a radial line from the axis E through the point J will intersect the surface G at a point N and the moment of reaction of the spring about the point K will be proportional to the length of the line KN.

Figure 3:
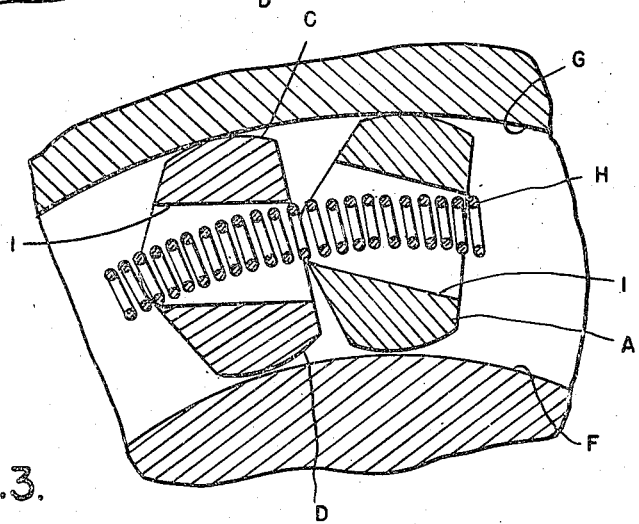
Fig. 3 illustrates the position of the sprag when the clutch is revolving at a speed higher than a predetermined point.

As centrifugal force is proportional to angular velocity, it is evident that at some predetermined speed the moment of mass reaction about the point K will be in excess of the opposed moment of spring reaction about this point. This will rotate the sprag in a clockwise direction and withdraw the surface D from frictional contact with the surface F, as shown in Fig. 3. Consequently, the driven member can revolve freely and without wear of the surfaces D and F.

Figure 2:
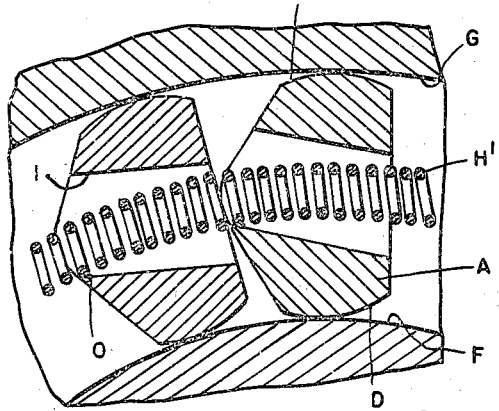
Fig. 2 is a similar view of a modified construction.

The only difference between the construction above described and that illustrated in Fig. 2 is that the latter uses a contracting spring H' instead of the expanded spring H. This spring bears upon the sprag at a point O and tends to rotate it in counterclockwise direction as is the case with the spring H. There is, however, a further difference that the mass reaction of the spring H increases its energizing force, whereas the mass reaction of the spring H' diminishes the energizing force. However, by properly proportioning the parts with either construction, the desired effect may be obtained, that is, the release of the sprag from frictional contact with the driving member when the speed of rotation is above a predetermined point.

What we claim as our invention is:

1. In a one-way clutch, the combination with independently rotatable coaxial members provided with radially spaced concentric surfaces, of a sprag extending between and bearing against said surfaces to form a clutching engagement, the center of mass of said sprag being laterally offset with respect to the point of bearing on the outer of said surfaces by a predetermined limited dimension such that centrifugal force tends to turn said sprag about said point out of engagement with the inner of said surfaces and energizing means for oppositely turning the sprag about said point into clutching engagement with a moment less than that of the mass reaction of said sprag at an angular velocity of the clutch in excess of a predetermined limit.

2. In a one-way clutch, the combination with independently rotatable coaxial members provided with radially spaced concentric surfaces, of a sprag extending between and bearing against said surfaces to form a clutching engagement, the center of mass of said sprag being laterally offset with respect to the point of bearing on the outer of said surfaces by a predetermined limited dimension such that centrifugal force tends to turn the sprag about said point out of engagement with the inner of said surfaces and resilient means reacting upon said sprag to turn the same oppositely about said point into clutching engagement with a moment less than that of the mass reaction of said sprag at an angular velocity of the clutch in excess of a predetermined limit.

3. In a one-way clutch, the combination with independently rotatable coaxial members provided with radially spaced concentric inner and outer surfaces, of a sprag having eccentric inner and outer curved surfaces for respectively contacting with said inner and outer concentric surfaces, the center of mass of said sprag being slightly laterally offset with respect to the point of bearing of said outer surfaces so that centrifugal force tends to turn said sprag about said point out of engagement with the inner of said surfaces, and resilient energizing means reacting upon said sprag to turn the same oppositely about said point into clutching engagement, with a moment greater than that of the mass reaction of said sprag up to a predetermined velocity of rotation and less than said mass reaction at higher velocities of rotation.

4. In a one-way clutch, the combination with independently rotatable coaxial members provided with radially spaced concentric inner and outer surfaces, of a series of sprags extending between and bearing against said surfaces to form a clutching engagement therewith, each of said sprags having eccentric inner and outer curved surfaces and the center of mass being slightly laterally offset from the point of contact of said outer surfaces, and resilient energizing means engaging all of said sprags and reacting on each to turn it oppositely about said point of contact with a moment greater than the mass reaction of the sprag up to a predetermined velocity of rotation and less at higher velocities.

IVOR J. GRUENBERG.
CARL K. DAVIS.

REFERENCES CITED

The following references are of record in the file of this patent:

UNITED STATES PATENTS

| Number | Name | Date |
|---|---|---|
| 2,385,799 | Dodge | Oct. 2, 1945 |
| 2,386,013 | Swenson | Oct. 2, 1945 |
| 2,404,221 | Dodge | July 16, 1946 |
| 2,407,772 | Dodge | Sept. 17, 1946 |

FOREIGN PATENTS

| Number | Country | Date |
|---|---|---|
| 756,885 | France | Oct. 2, 1933 |